March 18, 1958 G. L. SPITZMESSER 2,827,190
AUXILIARY HAND TRUCK FOR HAND TRUCK ASSEMBLIES
Filed Aug. 3, 1956 2 Sheets-Sheet 1
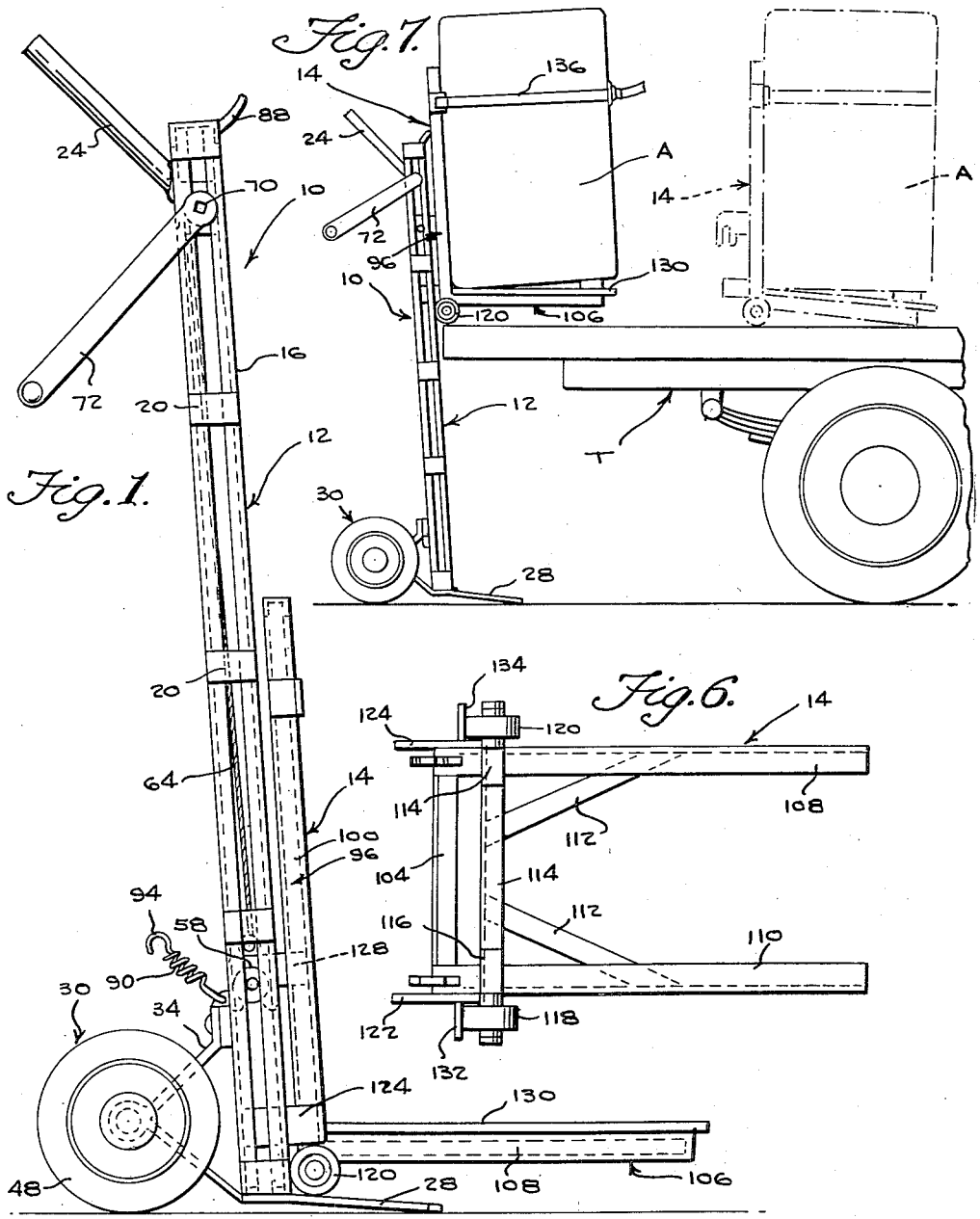
INVENTOR.
Gordon L. Spitzmesser
BY
McMorrow, Berman & Davidson
ATTORNEYS

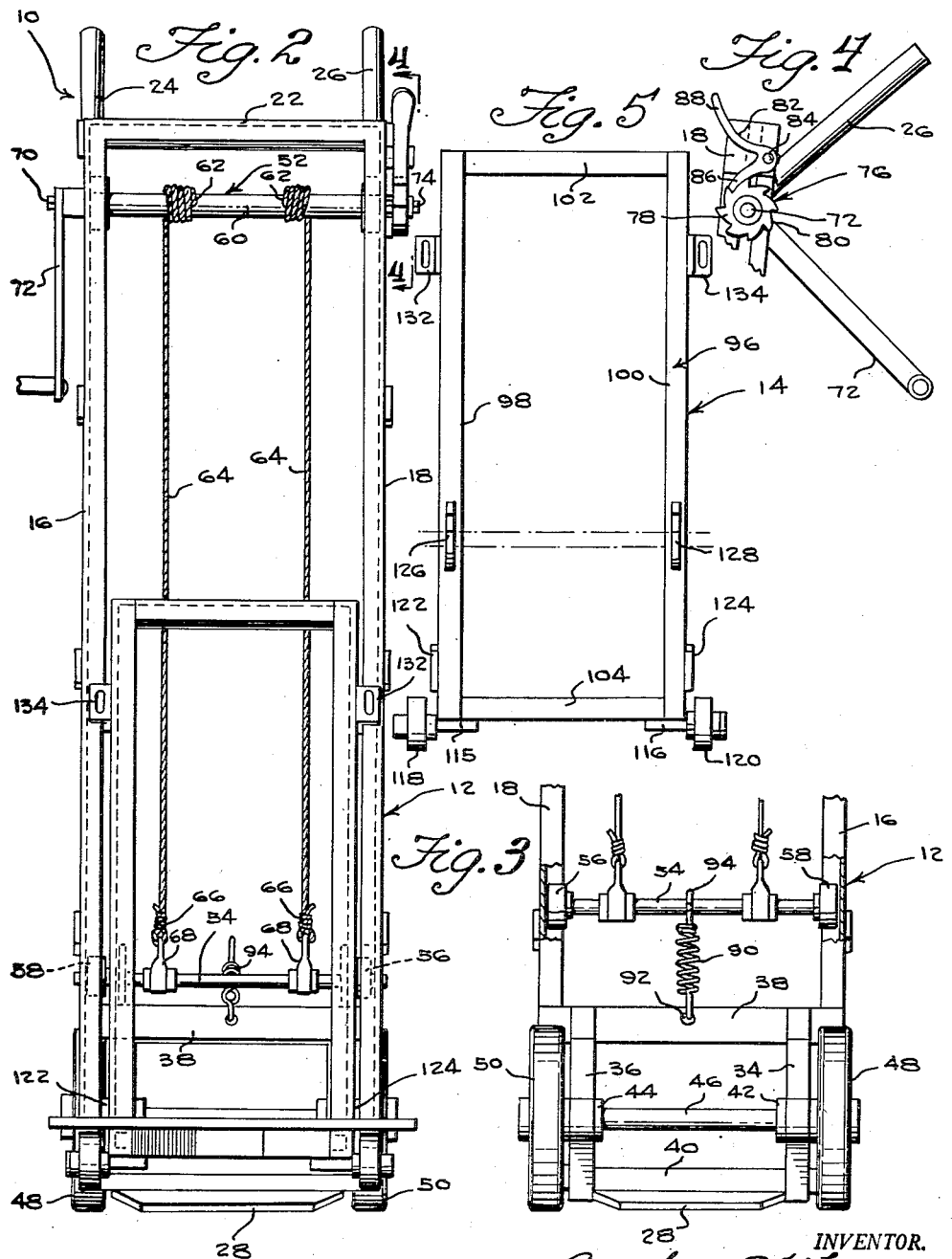

United States Patent Office 2,827,190
Patented Mar. 18, 1958

2,827,190

AUXILIARY HAND TRUCK FOR HAND TRUCK ASSEMBLIES

Gordon L. Spitzmesser, Elwood, Ind.

Application August 3, 1956, Serial No. 601,897

3 Claims. (Cl. 214—621)

This invention relates generally to article handling and is more particularly concerned with a hand truck assembly incorporating an auxiliary hand truck which may be utilized in the manner of a conventional hand truck for loading articles to be lifted thereon, the hand truck assembly being utilized in the conventional manner for transporting articles over a support surface, and the auxiliary hand truck being elevatable on the hand truck assembly for raising articles on the auxiliary hand truck to a position for ready loading on a truck bed, in the rear of a station wagon, etc.

An additional object of invention in conformance with that set forth is to provide a hand truck assembly incorporating a frame including guide rails, handle means at the upper end of the frame and a laterally projecting foot portion at the opposite end, the frame being vehicular incorporating a wheel assembly suitably secured at a lower portion of the frame opposite the foot portion thereof, the frame incorporating a power assembly including lift means reciprocably received thereon for longitudinal movement on the guide rails, and an auxiliary hand truck including a back portion and laterally extending platform portion including wheel means at the intersection thereof, the back portion being detachably engageable with the lift means and the wheel means being rotatably engageable with the guide rails of the frame of the hand truck.

And yet another object of invention in conformance with that set forth is to provide a hand truck assembly of the character involved which is readily and economically manufactured, easily used and maintained, and highly satisfactory, practical and acceptable for the purpose intended.

These together with other objects and advantages which will subsequently become apparent reside in the details of construction and operation as more fully hereinafter described and claimed, reference being had to the accompanying drawing forming a part hereof, wherein like numerals refer to like parts throughout, and in which:

Figure 1 is a side elevational view of the novel hand truck assembly showing the auxiliary hand truck of the invention mounted thereon;

Figure 2 is a front elevational view of the novel hand truck assembly looking substantially from right to left in Figure 1;

Figure 3 is a fragmentary rear elevational view of the main hand truck of the novel assembly;

Figure 4 is an enlarged fragmentary side elevational view looking substantially from line 4—4 of Figure 2, showing the detail of the latch means for the power lift means of the novel hand truck assembly;

Figure 5 is a rear elevational view of the auxiliary hand truck of the invention;

Figure 6 is a bottom plan view of the auxiliary hand truck of the invention; and Figure 7 is a side elevational view of the novel hand truck assembly, showing the auxiliary hand truck in an elevated position, and further showing by means of phantom lines the manner in which the auxiliary hand truck may be unloaded from the hand truck upon which it is transported and elevated for the purpose of loading said article on a truck bed or the like.

Referring to the drawing in detail, the novel hand truck assembly is indicated generally at 10, said hand truck assembly comprising a main hand truck indicated generally at 12 and an auxiliary hand truck indicated generally at 14.

The main hand truck 12 comprises a frame including spaced elongated longitudinally extending guide rails 16 and 18 which conveniently comprise channels having a U-shaped cross section and being constructed from L-shaped angle members secured with flange portions thereof extending toward each other by means of transverse plate elements 20. Extending transversely in suitably secured relationship at the upper ends of the guide rails 16 and 18 is a suitable brace bar 22, and the upper ends of the guide rails 16 and 18 terminate in rearwardly extending handle elements 24 and 26, respectively. Suitably secured in transverse relationship at the lower end of the guide rails 16 and 18 is a forwardly extending slightly angulated toe member or plate 28 which may taper slightly toward its forward end for facilitating the placement of articles thereon such as barrels, boxes and the like, in the usual manner, and suitably secured in rearwardly extending relationship from the toe plate 28 is a wheel assembly indicated generally at 30 which comprises a pair of rearwardly extending V-shaped mounting brackets 32 and 34, see Figure 3, secured in spaced aligned relationship at opposite ends to transverse brace strips 38 and 40 which in turn are secured on rear portions of the guide rails 16 and 18. The mounting brackets 34 and 36 incorporate aligned tubular bearing portions 42 and 44, respectively, having journaled therethrough a suitable support axle 46 which has mounted on opposite ends support wheels 48 and 50.

Power means indicated generally at 52 is provided for raising and lowering the auxiliary hand truck 14 as subsequently will be described in detail, said power means comprising a lift bar 54 incorporating roller members 56 and 58 at its opposite end, see Figure 3, for example, said roller members 56 and 58 being received within the U-shaped guide rails 18 and 16, respectively. Extending transversely beneath the brace bar 22 with opposite ends extending through the guide rails 16 and 18 is a shaft member 60 constituting winch means which has fixedly secured thereto in spaced relationship thereon one end 62 of spaced lift cables 64 constructed from steel braided wire, for example, said cables 64 being secured at their lower ends 66 to spaced mounting assemblies 68 disposed in spaced relationship on the lift bar or rod 54. One end portion of the shaft 60 identified at 70 receives thereon a removable handle 72 for rotating the shaft 60 and accordingly raising the lift rod 54. The other end 74 of the shaft 60, see Figures 2 and 4, for example, incorporates thereon latch means indicated generally at 76 comprising a ratchet wheel 78 suitably secured on the end 72 of the shaft 60, said ratchet wheel including a plurality of circumferentially disposed teeth 80 permitting one way rotation of the shaft 60 when the teeth are engaged by a latch or dog element 82 which is intermediately pivoted at 84 on the outer surface of the guide rail 18, including a latch portion 86 engageable with the aforementioned teeth 80, and an actuating handle portion 88 for disengaging said dog portion with the teeth. Thus the lift bar or rod 54 may be maintained in various positions of vertical or longitudinal adjustment along the guide rails 16 and 18, for the purpose of loading an article on a truck bed or in the back end of a station wagon, for example, as clearly illustrated in Figure 7.

When the auxiliary hand truck is not being utilized, a coil spring 90, see Figures 2 and 3, which has one end secured in a suitable aperture portion 92 extending transversely through the member 38 of the frame, will have the opposite end 94 thereof disposed in overlying relationship relative to the lift bar or rod 54 wherein said lift rod is retained in a relatively fixed position when the main hand truck is utilized in a conventional manner.

The auxiliary hand truck 14 comprises a back member including a rectangularly conformed frame 96, see Figure 5, for example, including side rail portions 98 and 100 having extending transversely between upper end portions thereof suitably secured upper and lower frame elements 102 and 104. Suitably secured in transverse relationship and extending laterally from the lower frame element 104 at a slightly obtuse angle relative to the back portion 96 of the auxiliary hand truck is a platform portion indicated generally at 106 comprising spaced support arms 108 and 110, see Figure 6, suitably braced by brace strips 112 which extend angularly from the arms 108 and 110 and a transverse brace bar 114. Extending laterally from suitably secured stub axles 115 and 116 at opposite sides of the arms 108 and 110, respectively, are combined support wheels and roller elements 118 and 120 which are respectively engageable with a support surface when the auxiliary hand truck is used exclusive of the main hand truck, or which will engage the outer surface of the guide rails 16 and 18, respectively, when the auxiliary hand truck is being adjusted to the elevated position shown for example in Figure 7. In order to prevent lateral displacement of the auxiliary hand truck when disposed on the main hand truck, extending rearwardly from an intermediate portion of the side frame elements 98 and 100 are guide plates 122 and 124, respectively, which are respectively engageable on opposed inner surface portions of the guide rails 16 and 18, respectively, as clearly seen in Figure 2, for example. Extending laterally from intermediate portions of the side frame elements 98 and 100 and secured thereon in any suitable manner in rearwardly extending relationship are suitable downwardly opening hook elements 126 and 128 which are extendible over the lift rod 54 providing means wherein the auxiliary hand truck 14 may be readily raised from the position shown in Figure 1 to the position shown in Figure 7, for example.

If desired a suitable plate member of plywood, metal or the like indicated at 130 may be disposed in overlying relationship on the upper surface of the arms 108 and 110 of the platform portion of the auxiliary hand truck and may have disposed therein a suitable bail, safe, etc. as indicated at A in Figure 7. For the purpose of maintaining the article on the platform portion 106 of the auxiliary hand truck the side frame elements 98 and 100 have extending laterally from opposite side portions thereof suitable loop elements 132 and 134, respectively, and have suitably secured thereto a flexible retaining strap 136 disposable in circumposed relationship about the article A.

Use of the novel hand truck assembly is believed readily apparent. As seen in Figures 1 and 7, the auxiliary hand truck 14 is disposed on the main hand truck 12 whereafter the article A is disposed on the platform portion of the auxiliary hand truck, being strapped thereon if desired, and is subsequently raised to the elevated position shown in Figure 7 with a minimum amount of effort, thus avoiding the possibility of accidental injury to a person attempting to lift a relatively heavy load, whereafter the lift rod 54 may be lowered permitting the auxiliary hand truck to be manually urged to the phantom line position shown in Figure 7 for disposition on the truck bed indicated generally at T.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. A hand truck assembly comprising a main hand truck incorporating a frame including spaced elongated longitudinally extending guide rails, handle means on an upper end portion of the frame, a laterally projecting foot plate member secured transversely of the lower portion of the frame and extending in an opposite direction to the handle means, a two wheel assembly on the frame opposite the laterally projecting foot plate member providing means for tilting and supporting the frame during movement on a support surface, a power assembly on said frame including lift means reciprocably received on the guide rails for longitudinal adjusted movement thereon, and an auxiliary hand truck comprising a frame including a longitudinally extending back portion, a laterally extending platform portion extending transversely of the back portion, latch means on the back portion detachably engaging the lift means, and a two wheel assembly on the auxiliary hand truck at the intersection of the back and platform portions engageable with the guide rails during longitudinal movement of the auxiliary hand truck thereon and providing means for tilting and supporting the auxiliary hand truck frame during independent movement on a support surface, said guide rails comprising channels having a U-shaped cross section opening toward each other, the power assembly comprising a transverse lift rod including roller elements at opposite ends rotatably received in the U-shaped channels, flexible cable means secured at one end to the transverse lift rod and extending toward the upper portion of the frame, a rod journaled transversely through opposed portions adjacent the upper ends of the guide rails, a manually operable crank securable to one end of the upper rod for rotating the same for elevating the lift rod, and latch means engageable with said upper rod for retaining the lift rod in various positions of elevated adjustment.

2. A hand truck assembly comprising a frame including spaced elongated longitudinally extending guide rails, handle means on an upper end portion of the frame, a laterally projecting foot plate member secured transversely of the lower portion of the frame and extending in an opposite direction to the handle means, a wheel assembly on the frame opposite the laterally projecting foot plate member providing means for supporting the truck during movement on a support surface, a power assembly on said frame including lift means reciprocably received on the guide rails for longitudinal adjusted movement thereon, and an auxiliary hand truck comprising a frame including a longitudinally extending back portion, a laterally extending platform portion extending transversely of the back portion, a latch means on the back portion detachably engaging the lift means, and a wheel assembly on the auxiliary hand truck at the intersection of the back and platform portions engageable with the guide rails during longitudinal movement of the auxiliary hand truck thereon and providing means for supporting the auxiliary hand truck during movement on a support surface, said guide rails comprising channels having a U-shaped cross section opening toward each other, the power assembly comprising a transverse lift rod including roller elements at opposite ends rotatably received in the U-shaped channels, flexible cable means secured at one end to the transverse lift rod and extending toward the upper portion of the frame, a rod journaled transversely through opposed portions adjacent the upper ends of the guide rails, manually operable crank securable to one end of the upper rod for rotating the same for elevating the lift rod, and latch means engageable with said upper rod for retaining the lift rod in various positions of elevated adjustment, the latch means comprising downwardly opening hook elements secured on the back portion of the auxiliary hand truck removably engageable with the lift rod, the wheel assembly on the auxiliary hand truck including wheels engageable with the outer surface portions of the guide rails, the back portion of the auxiliary hand truck including spaced guide plates extending rearwardly therefrom for sliding engagement with the guide rails and for preventing lateral displacement of the auxiliary hand truck off the guide rails.

3. A hand truck assembly comprising a frame including spaced elongated longitudinally extending guide rails, handle means on an upper end portion of the frame, a laterally projecting foot plate member secured transversely of the lower portion of the frame and extending in an opposite direction to the handle means, a wheel assembly on the frame opposite the laterally projecting foot plate member providing means for supporting the truck during movement on a support surface, a power assembly on said frame including lift means reciprocably received on the guide rails for longitudinal adjusted movement thereon, and an auxiliary hand truck comprising a frame including a longitudinally extending back portion, a laterally extending platform portion extending transversely of the back portion, latch means on the back portion detachably engaging the lift means, and a wheel assembly on the auxiliary hand truck at the intersection of the back and platform portions engageable with the guide rails during longitudinal movement of the auxiliary hand truck thereon and providing means for supporting the auxiliary hand truck during movement on a support surface, said guide rails comprising channels having a U-shaped cross section opening toward each other, the power assembly comprising a transverse lift rod including roller elements at opposite ends rotatably received in the U-shaped channels, flexible cable means secured at one end to the transverse lift rod and extending toward the upper portion of the frame, a rod journaled transversely through opposed portions adjacent the upper ends of the guide rails, manually operable crank securable to one end of the upper rod for rotating the same for elevating the lift rod, and latch means engageable with said upper rod for retaining the lift rod in various positions of elevated adjustment, the back portion of the auxiliary hand truck having secured thereto adjacent upper end portions thereof flexible strap means extendible in circumposed relationship about an article supported on the platform portion of the auxiliary hand truck.

References Cited in the file of this patent

UNITED STATES PATENTS

| | | |
|---|---|---|
| 1,208,117 | Frost | Dec. 12, 1916 |
| 1,524,473 | Brinton | Jan. 27, 1925 |
| 1,978,170 | Roesner | Oct. 23, 1934 |
| 2,514,825 | Zenko | July 11, 1950 |
| 2,598,489 | Bayer et al. | May 27, 1952 |
| 2,796,186 | Arnot | June 18, 1957 |

FOREIGN PATENTS

| | | |
|---|---|---|
| 529,605 | Great Britain | Nov. 25, 1940 |